(12) United States Patent
Liu

(10) Patent No.: US 8,599,978 B2
(45) Date of Patent: Dec. 3, 2013

(54) INTERFERENCE ELIMINATION METHOD AND DATA TRANSMITTING APPARATUS

(75) Inventor: Sheng Liu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 96 days.

(21) Appl. No.: 13/293,774

(22) Filed: Nov. 10, 2011

(65) Prior Publication Data
US 2012/0051459 A1    Mar. 1, 2012

Related U.S. Application Data

(63) Continuation of application No. PCT/CN2009/071756, filed on May 12, 2009.

(51) Int. Cl.
*H04L 1/00*    (2006.01)

(52) U.S. Cl.
USPC .......... 375/346; 375/144; 375/148; 455/63.1; 455/114.2; 455/278.1; 455/296

(58) Field of Classification Search
CPC ............ H04W 28/048; H04B 1/71075; H04B 1/7107; H04B 1/71072; H04B 15/00; H04J 11/0023; H04J 11/0003; H04J 11/0033; H04J 11/0036; H04J 11/004; H04J 11/0043; H04J 11/0046
USPC .............. 375/144, 148, 346; 455/63.1, 114.2, 455/278.1, 296
See application file for complete search history.

(56) References Cited

U.S. PATENT DOCUMENTS 8,036,098 B2 * 10/2011 Pereira et al. ............... 370/201
2006/0280255 A1   12/2006 Hongming et al.
2009/0075686 A1    3/2009 Gomadam et al.

FOREIGN PATENT DOCUMENTS

CN    101194433 A    6/2008
CN    101217304 A    7/2008
CN    101232478 A    7/2008

OTHER PUBLICATIONS

Gomadan et al. "Approaching the Capacity of Wireless Networks through Distributed Interference Alignment", Mar. 2008, IEEE, pp. 1-6.*
Extended European Search Report issued in corresponding European Patent Application No. 09838580.0, mailed Jun. 6, 2012.
Cadambe et al., "Interference Alignment and Degrees of Freedom of the *K*-User Interference Channel" IEEE Transactions on Information Theory, vol. 54, No. 8, Aug. 2008.
Gomadam et al., "Approaching the Capacity of Wireless Networks through Distributed Interference Alignment" IEEE 2008.
Written Opinion of the International Searching Authority issued in corresponding PCT Patent Application No. PCT/CN2009/071756, mailed Feb. 11, 2010.

(Continued)

*Primary Examiner* — Sophia Vlahos
(74) *Attorney, Agent, or Firm* — Brinks Gilson & Lione

(57) ABSTRACT

An interference elimination method provided herein includes: the $i^{th}$ transmitter of a group transmitters obtains an interference vector of each user, where: the interference vector of the $k^{th}$ user is $H_{ki}w_{im}$; obtains at least L−N linear combinations for each user, wherein: the linear combination includes linear combinations of aligned interference vectors and linear combinations of N−$L_k$ interference vectors, N is the number of receiving antennas of the user, and L is a sum of the signal flows of all users; the pre-coding vectors of all transmitters is obtained according to the linear combinations of all users; and the signals pre-coded using the pre-coding vectors are sent. Accordingly, a data transmitting apparatus is provided herein.

15 Claims, 3 Drawing Sheets

(56) References Cited

OTHER PUBLICATIONS

International Search Report issued in corresponding PCT Patent Application No. PCT/CN2009/071756, mailed Feb. 11, 2010.

Gomadam et al., "Approaching the Capacity of Wireless Networks through Distributed Interference Alignment" IEEE Global Telecommunications Conference, 2008. IEEE GLOBECOM 2008.

* cited by examiner

INTERFERENCE ELIMINATION METHOD AND DATA TRANSMITTING APPARATUS

CROSS REFERENCE TO RELATED APPLICATIONS

This application is a continuation of International Application No. PCT/CN2009/071756, filed on May 12, 2009, which is incorporated by reference in its entirety.

FIELD OF THE INVENTION

The present invention relates to radio communications technologies, and in particular, to an interference elimination method and a data transmitting apparatus.

BACKGROUND OF THE INVENTION

Interference is one of the main factors that restrict the capacity of a wireless communication system. Taking a cellular system as an example, although the impact caused by interference may be relieved through resource allocation and power control, the interference between cells is still a main factor that restricts the capacity of a cellular system.

A main solution for suppressing the interference between cells is to eliminate interference through synergetic operation of multiple adjacent cells. In the downlink direction, interference can be eliminated by a pre-coding technology through synergetic operation of multiple adjacent cells. One mode of interference elimination is: Adjacent cells completely share the data of the mobile terminal users that interfere with each other, but Base Stations (BSs) need to be interconnected through high-speed and large-bandwidth links, which are costly in a practical system. In the uplink direction, each mobile terminal is completely independent. One mode of interference elimination is: Data is received jointly between the BSs, and the interference between users is eliminated through joint detection, and the signals of each user are separated out. This mode of interference elimination requires larger bandwidth than the mode of sharing the data to be sent in the downlink direction, and also leads to high costs in a practical system.

For uplink or downlink direction, eliminating interference between cells without sharing the data to be transmitted is the most cost-efficient and practicable solution to the operator. Besides, if a relay station is employed, because no direct interconnection link exists between relay stations, the suppression of the interference between relay stations also requires the technology of eliminating interference without sharing the data to be transmitted. In practice, all such problems may be summarized as interference elimination of a K-user Multiple Input Multiple Output (MIMO) interference channel model. In a K-user interference channel model, the number of the transmitting sources and the number of users are K; the number of antennas of each transmitting source is M, the number of receiving antennas of each user is N, and no data is shared between the transmitting sources, and no data is shared between the users, namely, each transmitter knows data of only its own user (or receiver) but does not know data of other users (or receivers). Therefore, each transmitter can perform interference suppression between users only through pre-coding for data of its own users.

Interference alignment is a main technical solution for eliminating interference in the K-user interference channel model. Its basic conception is that the interference vectors received by user i (namely, the user numbered i) from other transmitters are as aligned as possible, thus obtaining the minimum possible interference space and eliminating interference. However, the research on the linear interference alignment technology is still in the initial stage, and the effective interference alignment for any number of users and any number of antennas is still pending.

SUMMARY OF THE INVENTION

In one aspect of the invention, a method is provided. The method includes:

obtaining, by the $i^{th}$ transmitter of a group transmitters, an interference vector of each user, where: the interference vector of the $k^{th}$ user is $H_{ki}w_{im}$, k, i, and m are positive integers, $1 \leq k \leq K$, $k \neq i$, $1 \leq m \leq L_k$, m is an index of the number of signal flows, K is the number of users, $L_k$ is the number of the signal flows of the $k^{th}$ user, $H_{ki}$ is a channel matrix from the $i^{th}$ transmitter to the $k^{th}$ user, and $w_{im}$ is a pre-coding vector of the $i^{th}$ transmitter with the index of the number of the signal flows being m;

obtaining at least L–N linear combinations for each user, where: a linear combinations includes linear combinations of aligned interference vectors and linear combinations of N–$L_k$ interference vectors, N is the number of receiving antennas of the user, and L is the sum of the signal flows of all users;

obtaining pre-coding vectors of all transmitters according to the linear combinations of all users; and sending signals pre-coded using the pre-coding vectors.

Another method includes:

obtaining, by the $i^{th}$ transmitter of a group of transmitters, an interference vector of each user where: the interference vector of the $k^{th}$ user is $H_{ki}^{H}g_{km}$, k, i, and m are positive integers, $1 \leq k \leq K$, $k \neq i$, $1 \leq m \leq L_k$, m is an index of the number of signal flows, K is the number of users, $L_k$ is the number of the signal flows of the $k^{th}$ user, $H_{ki}$ is a channel matrix from the $i^{th}$ transmitter to the $k^{th}$ user, $g_{km}$ is a receiving filtering vector of the $k^{th}$ user with the index of the number of signal flows being m; and $(\cdot)^H$ means conjugate transposition of a matrix;

obtaining at least L–M linear combinations for each user, where: a linear combinations includes linear combinations of aligned interference vectors and linear combinations of M–$L_k$ interference vectors, M is the number of transmitting antennas on the transmitter, and L is a sum of the signal flows of all users; and obtaining receiving filtering vector of each user according to the linear combinations of all users.

In another aspect of the invention, a transmitter is provided, wherein the transmitter is the $i^{th}$ transmitter of a group of transmitters. The transmitter includes:

a processor, configured to: obtain an interference vector of each user, where: the interference vector of the $k^{th}$ user is $H_{ki}w_{im}$, k, i, and m are positive integers, $1 \leq k \leq K$, $k \neq i$, $1 \leq m \leq L_k$, m is an index of the number of signal flows, K is the number of users, $L_k$ is the number of signal flows of the $k^{th}$ user, $H_{ki}$ is a channel matrix from the $i^{th}$ transmitter to the $k^{th}$ user, and $w_{im}$ is a pre-coding vector of the $i^{th}$ transmitter with the index of the number of the signal flows being m;

obtain at least L–N linear combinations for each user, where: a linear combination includes linear combinations of aligned interference vectors and linear combinations of N–$L_k$ interference vectors, N is the number of receiving antennas of the user, and L is a sum of the signal flows of all users;

obtain pre-coding vectors of all transmitters according to linear combinations of all users; and send signals pre-coded using the pre-coding vectors.

Another transmitter is provided. The transmitter includes:

a processor, configured to obtain an interference vector of each user, where: the interference vector of the $k^{th}$ user is $H_{ki}^{H}g_{km}$; k, i, and m are positive integers, $1 \leq k \leq K$, $k \neq i$, $1 \leq m \leq L_k$, m is an index of the number of signal flows, and K is the number of users, $L_k$ is the number of the signal flows of the $k^{th}$ user, $H_{ki}$ is a channel matrix from the $i^{th}$ transmitter to the $k^{th}$ user, $g_{km}$ is a receiving filtering vector of the $k^{th}$ user with the index of the number of signal flows being m; and $(\cdot)^H$ means conjugate transposition of a matrix;

obtain at least L−M linear combinations for each user, where: a linear combination comprises linear combinations of aligned interference vectors and linear combinations of M−$L_k$ interference vectors, M is the number of transmitting antennas on the transmitter, and L is a sum of the signal flows of all users; and obtain a receiving filtering vector of each user according to linear combinations of all users.

The interference elimination method and the transmitter provided herein eliminate interference for a communication system with any number of users and any number of antennas, and provide realized conditions for interference alignment. When they are applied to eliminate interference between cells, the costs of the service provider are reduced drastically and the system performance is improved at a low cost.

DETAILED DESCRIPTION OF THE EMBODIMENTS

The technical solution under the present invention is elaborated below with reference to accompanying drawings. Evidently, the embodiments described herein are only part of, rather than all of, the embodiments of the present invention. All other embodiments, which can be derived by those skilled in the art from the embodiments given herein without any creative effort, fall within the scope of the present invention.

Figure 1:
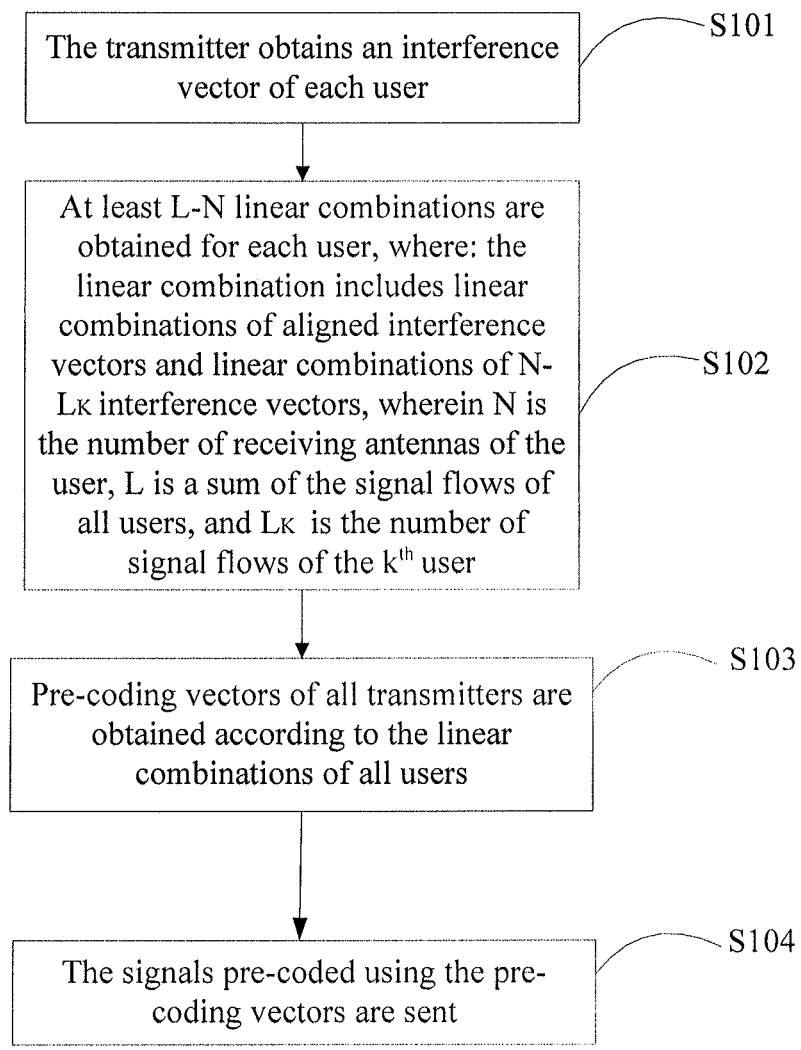
FIG. 1 is a flowchart of an interference elimination method in an embodiment of the present invention.

As shown in FIG. 1, an interference elimination method provided in an embodiment of the present invention is applied to eliminate interference on the transmitter in a wireless communication system. The method includes the following steps:

S101: The transmitter (for example, the transmitter is the $i^{th}$ transmitter of a group of transmitters) obtains an interference vector of each user, where: the interference vector of the $k^{th}$ user is $H_{ki}w_{im}$, k, i, and m are positive integers, $1 \leq k \leq K$, $k \neq i$, $1 \leq m \leq L_k$, m is an index of the number of signal flows, K is the number of users, $L_k$ is the number of signal flows of the $k^{th}$ user, $H_{ki}$ is a channel matrix from the $i^{th}$ transmitter to the $k^{th}$ user, and $w_{im}$ is a pre-coding vector of the $i^{th}$ transmitter with the index of the number of signal flows being m.

The transmitter here may be a BS, the relay station, or a User Equipment (UE); and the user refers to the receiver corresponding to the transmitter, for example, a terminal; the interference vector of the $i^{th}$ user refers to a product of a channel matrix and the pre-coding vector, where the channel matrix is from other transmitters, except the transmitter of the $i^{th}$ user, to the $i^{th}$ user.

S102: At least L−N linear combinations are obtained for each user, where: the linear combination includes linear combinations of aligned interference vectors and linear combinations of N−$L_k$ interference vectors, N is the number of receiving antennas of the user, and L is a sum of the signal flows of all users.

The combination coefficients may be simply set to 0 or 1, and a linear equation may be derived from each linear combination.

S103: Pre-coding vectors of all transmitters is obtained according to the linear combinations of all users.

For all users, an equation group is derived from the equation obtained in S102, and the unknown number in the equation group is the pre-coding vectors of each transmitter. After this equation group is solved, the pre-coding vectors of each BS is obtained.

S104: The signals pre-coded using the pre-coding vectors are sent.

Figure 2:
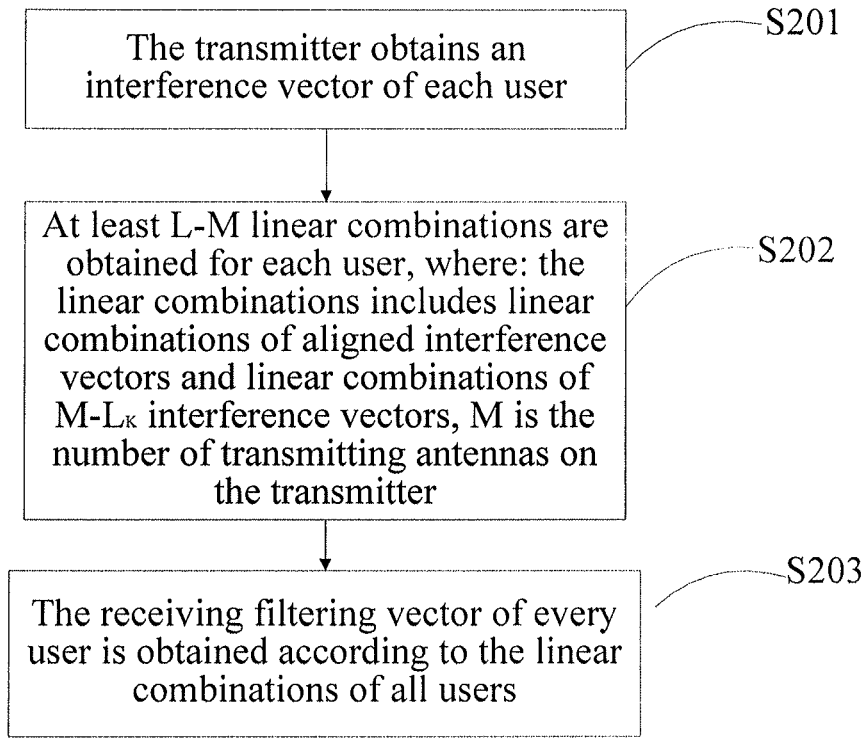
FIG. 2 is a flowchart of another interference elimination method in an embodiment of the present invention.

Paired with the interference elimination method on the transmitter, an interference elimination method applied on the receiver is provided in an embodiment of the present invention. As shown in FIG. 2, the interference elimination method applied on the receiver includes the following steps:

S201: The transmitter (for example, the transmitter is the $i^{th}$ transmitter of a group of transmitters) obtains an interference vector of each user, where: the interference vector of the $k^{th}$ user is $H_{ki}^{H}g_{km}$; k, i, and m are positive integers, $1 \leq k \leq K$, $k \neq i$, $1 \leq m \leq L_k$, m is an index of the number of signal flows, and K is the number of users; $L_k$ is the number of the signal flows of the $k^{th}$ user; $H_{ki}$ is a channel matrix from the $i^{th}$ transmitter to the $k^{th}$ user; $g_{km}$ is a receiving filtering vector of the $k^{th}$ user with the index of the number of signal flows being m; and $(\cdot)^H$ means conjugate transposition of a matrix.

S202: At least L−M linear combinations are obtained for each user, where: a linear combination includes linear combinations of aligned interference vectors and linear combinations of M−$L_k$ interference vectors, M is the number of transmitting antennas on the transmitter, and L is a sum of the signal flows of all users.

The combination coefficients may be simply set to 0 or 1, and a linear equation may be derived from each linear combination.

S203: The receiving filtering vectors of all users is obtained according to the linear combinations of all users.

For all users, an equation group is derived from the equation obtained in S102, and the unknown number in the equation group is the receiving filtering vector of each user. After this equation group is solved, the receiving filtering vector of each user is obtained.

Unlike the scenario of interference alignment based on the transmitter, the scenario here solves the receiving filtering vector of each user.

In the embodiment of the present invention, the basic conception is interference alignment. That is, the interference vectors received by the $i^{th}$ user from other transmitters are as aligned as possible so that a minimum possible interference space is obtained and the interference is eliminated for any number of antennas and any number of users.

The interference elimination method is elaborated. In an embodiment of the present invention, the channel model is the K-user MIMO interference channel model. In this model, the number of BSs as transmitters and the number of users as receivers are K; the number of antennas of each BS is M, the number of receiving antennas of each user is N, and no data is shared between the BSs, and no data is shared between the users, namely, each transmitter knows data of only its own receiver but does not know data of other receivers. Therefore, each transmitter can perform interference suppression between users only through pre-coding for data of its own receivers. Nevertheless, the embodiments of the present invention are not limited to the K-user MIMO interference channel model. Other channel models are based on the same principles, and are not repeated here any further.

The signals received by the $k^{th}$ user may be represented by:

$$y_k = H_{k1}w_1x_1 + H_{k2}w_2x_2 + \ldots + H_{kk}w_kx_k + \ldots + n_k \quad (1)$$

In the equation above, $H_{ki}$ represents a channel matrix from the $i^{th}$ BS to the $k^{th}$ user, and its number of dimensions is N×M; $w_i$ is the pre-coding vector of the $i^{th}$ BS, and its number of dimensions is M×1; $x_i$ means the sent signals, and is a scalar; and $n_k$ is a noise vector whose square error is $\sigma^2$.

The linear receiving total energy of the user represents the weighted sum of the signals received by all antennas, and the estimation of the signals received by the $k^{th}$ user is:

$$\hat{x}_k = g_k^H y_k = g_k^H H_{kk}w_kx_k + (g_k^H H_{k1}w_1x_1 + g_k^H H_{k2}w_2x_2 + \ldots) + g_k^H n_k \quad (2)$$

In the equation (2), $g_k^H$ is a 1-row N-column vector for weighting. If $\|g_k\|^2 = 1$, the selection of $g_k$ does not change the power of noise, and therefore, a necessary condition of obtaining the best estimate of $x_k$ is: for all i, k=1, 2, ... K, $g_k^H H_{ki} w_i = 0$, for i≠k,
$g_k^H H_{kk} w_k = c_k$, $c_k$ is a positive number and is maximized.

For the $k^{th}$ user, when $w_i$ is definite, $g_k^H H_{ki} w_i = 0|_{i \neq k}$, i=1, 2, ..., K. Supposing that $a_i = H_{ki} w_i$, $g_k^H a_i = 0|_{i \neq k}$, where $a_i = (a_{i1}, a_{i2}, \ldots, a_{iN})^T$, the following linear equation group inclusive of K equations is obtained:

$$\begin{cases} a_{11}g_{k1}^* + a_{12}g_{k2}^* + \ldots + a_{1N}g_{kN}^* = 0 \\ \ldots \\ a_{k-1,1}g_{k1}^* + a_{k-1,2}g_{k2}^* + \ldots + a_{k-1,N}g_{kN}^* = 0 \\ a_{k1}g_{k1}^* + a_{k2}g_{k2}^* + \ldots + a_{kN}g_{kN}^* = c_k \\ a_{k+1,1}g_{k1}^* + a_{k+1,2}g_{k2}^* + \ldots + a_{k+1,N}g_{kN}^* = 0 \\ \ldots \\ a_{K1}g_{k1}^* + a_{K2}g_{k2}^* + \ldots + a_{KN}g_{kN}^* = 0 \end{cases} \quad (3)$$

The prerequisite for ensuring a non-zero solution to equation group (3) is: The coefficient vector of at least K−N interference zero forcing equations among the K equations above is a linear combination of coefficient vectors of the other N−1 interference zero forcing equations except the $k^{th}$ equation. That prerequisite is a constraint condition of interference alignment. The interference zero forcing equations refer to the other N−1 equations with 0 being on the right side in equation group (3), except the $k^{th}$ equation. For a scenario that one user receives only one channel of signals, namely, a single-flow scenario:

$$H_{k,i_m}w_{i_m} = \sum_{n=1}^{N-1} \alpha_{kn} H_{k,i_n} w_{i_n} \quad (4)$$

In equation (4), k=1, 2, ..., k, $i_n|_{i=1,2,\ldots,N-1} \in S_{k1}$, $i_m|_{m=1,2,\ldots,K-N} \in S_{k2}$, $\alpha_{kn}$ represents a combination coefficient, $S_{k1}$ is a collection of aligned interference vectors and includes N−1 elements, $S_{k2}$ is a collection of the other interference vectors and includes K−N elements, and $S_{k1} \cup S_{k2} \cup \{k\} = \{1, 2, \ldots, K\}$.

For ease of description, the single-flow scenario is taken as an example, namely, each user receives only one channel of signals, or in other words, the number of signal flows of each user is 1. Nevertheless, the single-flow scenario may be generalized into a multi-flow scenario, namely, the number of signal flows of the $k^{th}$ user is $L_k$. In this case, for each user, at least L−N linear combinations are obtained. The linear combination includes the linear combinations of aligned interference vectors and the linear combinations of the other N−$L_k$ interference vectors, where N is the number of receiving antennas of the user, and L is the sum of the signal flows of all users. It is deducible that the foregoing interference elimination method is applicable when the upper limit of the sum of signal flows of all users is $$\frac{N^2 K}{NK - M}$$

rounded down or $$\frac{NK}{2}$$

rounded down, whichever is lower, namely, when the upper limit is $$\min\left\{\left\lfloor \frac{N^2 K}{NK - M} \right\rfloor, \left\lfloor \frac{NK}{2} \right\rfloor\right\},$$

where $\lfloor \ \rfloor$ refers to rounding down.

Figure 3:
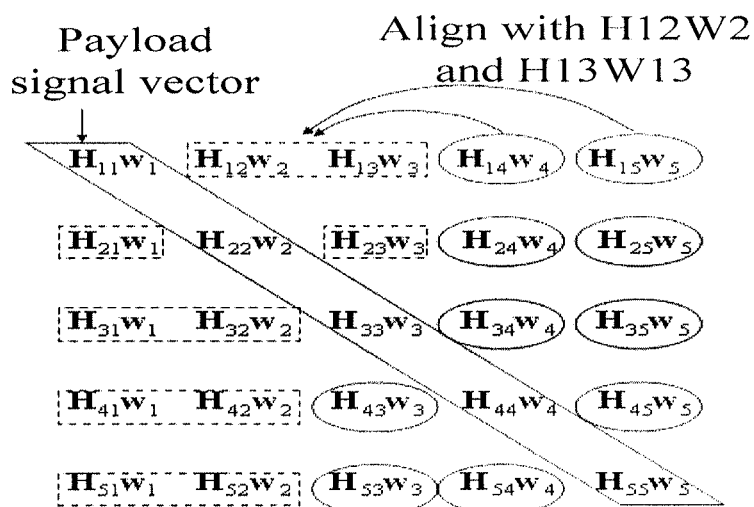
FIG. 3 shows interference alignment schematic diagram in an embodiment of the present invention.

FIG. 3 shows an interference alignment method. In FIG. 3, M=6, N=3, and K=5, indicating that there are 5 BSs and users, and the number of receiving antennas of each user is 3. For each user who receives only a single signal flow, the number of receiving antennas is 3. Therefore, the vector of the received signal has three dimensions. Two dimensions remain after one dimension is subtracted for the payload signal. Any three of the four interference vectors are linearly correlated.

As shown in FIG. 3, for the first user, namely, the first row, $H_{14}w_4$ is an interference vector that needs to be aligned, and $H_{14}w_2$ is a linear combination of $H_{12}w_2$ and $H_{13}w_3$, which can be expressed as:

$$H_{14}w_4 = \alpha_{11} H_{12}w_2 + \alpha_{12} H_{13}w_3 \quad (5)$$

Likewise, $H_{15}w_5$ is the second interference vector that needs to be aligned, and $H_{15}w_5$ is a linear combination of $H_{12}w_2$ and $H_{13}w_3$, which can be expressed as:

$$H_{15}w_5 = \alpha_{13} H_{12}w_2 + \alpha_{14} H_{13}w_3 \quad (6)$$

For the first user, the number of the aligned interference vectors is K−N=2; and the number of the other interference vectors is N−1=2. Likewise, for the second, third, fourth and fifth vectors, multiple equations like (5) and (6) may be obtained, which combine into an equation group. The solution to the equation group give each pre-coding vectors.

If $\alpha_{kn}$ is 0 or 1, the liner equation group is simplified. The pre-coding vectors of each BS are obtained. After the signals are pre-coded, they are sent out by the BS.

For M=N=3 and K=4, the total number of signal flows is L=4. Equation (4) may be expressed as:

$$\begin{bmatrix} 0 & \alpha_1 H_{12} & \beta_1 H_{13} & -H_{14} \\ \alpha_2 H_{21} & 0 & \beta_2 H_{23} & -H_{24} \\ \alpha_3 H_{31} & \beta_3 H_{32} & 0 & -H_{34} \\ \alpha_4 H_{41} & \beta_4 H_{42} & -H_{43} & 0 \end{bmatrix} \begin{bmatrix} w_1 \\ w_2 \\ w_3 \\ w_4 \end{bmatrix} = 0 \quad (7)$$

The combination coefficients may be selected to solve equation group (7) and obtain $w_k$.

For M=N=4 and K=4, the total number of signal flows is L=5, and the number of signal flows of the four users is 2, 1, 1, and 1 respectively. Equation (4) may be used to obtain the following linear equation group, which is solved to obtain $w_k$.

$$\begin{bmatrix} 0 & 0 & \beta_1 H_{12} & \gamma_1 H_{13} & -H_{14} \\ \alpha_2 H_{21} & \beta_2 H_{21} & 0 & \gamma_2 H_{23} & -H_{24} \\ \alpha_3 H_{31} & \beta_3 H_{31} & -H_{32} & 0 & \gamma_3 H_{34} \\ \alpha_4 H_{41} & \beta_4 H_{41} & \gamma_4 H_{42} & -H_{43} & 0 \end{bmatrix} \begin{bmatrix} w_{11} \\ w_{12} \\ w_2 \\ w_3 \\ w_4 \end{bmatrix} = 0 \quad (8)$$

After $w_k$ is obtained, the pre-coding vectors of each transmitting BS can be determined. In this way, the equivalent channel matrix from the transmitter to the $k^{th}$ receiver is ($H_{ki}w_i$). Based on the known equivalent channel matrix, a proper receiver is selected by each receiver to receive the payload signal, for example, minimum mean square error receiver, maximum likelihood receiver, and serial interference elimination receiver. After $w_k$ is obtained, the receiving filtering vector $g_k$ of each user can be obtained, namely, $$\left( \sum_{i=1}^{K} H_{ki} w_i w_i^H H_{ki}^H + \sigma^2 I_N \right)^{-1} H_{kk} w_k \text{ or}$$

$$\left( \sum_{i=1, i\neq k}^{K} H_{ki} w_i w_i^H H_{ki}^H + \sigma^2 I_N \right)^{-1} H_{kk} w_k,$$

where $\sigma^2$ is a square error of noise, $I_N$ is an N×N unit matrix, $(\bullet)^H$ refers to conjugate transposition of a matrix, and $(\bullet)^{-1}$ refers to inversion of a matrix.

The method of solving the foregoing equation group is further described below.

For equation (7), because the values of ($\alpha_k$, $\beta_k$) are flexible, this embodiment supposes that the $\beta_2$, $\beta_4$, $\alpha_3$ are all 0s for simplicity. It is easy to obtain:

$$\begin{cases} w_1 = \alpha_2^{-1} H_{21}^{-1} H_{24} w_4 \\ w_2 = \beta_3^{-1} H_{32}^{-1} H_{34} w_4 \\ w_3 = \alpha_4 \alpha_2^{-1} H_{43}^{-1} H_{41} H_{21}^{-1} H_{24} w_4 \end{cases} \quad (9)$$

and, $$H_{14} w_4 = \alpha_1 (\beta_3^{-1} H_{12} H_{32}^{-1} H_{34} + \alpha_1^{-1} \beta_1 \alpha_4 \alpha_2^{-1} H_{13} H_{43}^{-1} H_{41} H_{21}^{-1} H_{24}) w_4 \quad (10)$$

Supposing $\beta_1 = \alpha_1$, $w_4$ is an eigenvector of the following 3×3 matrix:

$H_{14}(\beta_3^{-1} H_{12} H_{32}^{-1} H_{34} + \alpha_4 \alpha_2^{-1} H_{13} H_{43}^{-1} H_{41} H_{21}^{-1} H_{24})^{-1}$.

According to the existing method of obtaining the eigenvector, $w_4$ is obtained. According to equation group (9), other pre-coding vectors are obtained.

It is evident that adjustable coefficients exist in the equations above. Therefore, each transmitter can control the transmitting power independently, without changing the interference alignment.

For (8), $w_4$ is treated as a predefined vector, namely, $w_4 = (e^{j\Phi_1}, e^{j\Phi_2}, e^{j\Phi_3}, e^{j\Phi_4})$, where $\phi_i$ is an argument from 0 to $2\pi$. Through transformation, the following equation group is obtained:

$$\begin{bmatrix} 0 & 0 & \beta_1 H_{12} & \gamma_1 H_{13} \\ \alpha_2 H_{21} & \beta_2 H_{21} & 0 & \gamma_2 H_{23} \\ \alpha_3 H_{31} & \beta_3 H_{31} & -H_{32} & 0 \\ \alpha_4 H_{41} & \beta_4 H_{41} & \gamma_4 H_{42} & -H_{43} \end{bmatrix} \begin{bmatrix} w_{11} \\ w_{12} \\ w_2 \\ w_3 \end{bmatrix} = \begin{bmatrix} H_{14} w_4 \\ H_{24} w_4 \\ -\gamma_3 H_{34} w_4 \\ 0 \end{bmatrix} \quad (11)$$

Supposing that $\beta_1$, $\alpha_2$, $\gamma_2$, $\alpha_3$, $\beta_3$, $\beta_4$, $\gamma_4$ are 0s, it is easy to obtain:

$$\begin{cases} w_{11} = \alpha_4^{-1} \gamma_1^{-1} H_{41}^{-1} H_{43} H_{13}^{-1} H_{14} w_4 \\ w_{12} = \beta_2^{-1} H_{21}^{-1} H_{24} w_4 \\ w_2 = \gamma_3 H_{32}^{-1} H_{34} w_4 \\ w_3 = \gamma_1^{-1} H_{13}^{-1} H_{14} w_4 \end{cases} \quad (12)$$

Supposing that M=N=4, K=3, L=6, and the number of signal flows transmitted for the users is 2, 2, and 2 respectively, the signals received by the users are:

$$\begin{cases} y_1 = H_{11} W_1 x_1 + H_{12} W_2 x_2 + H_{13} W_3 x_3 + n_1 \\ y_2 = H_{21} W_1 x_1 + H_{22} W_2 x_2 + H_{23} W_3 x_3 + n_2 \\ y_3 = H_{31} W_1 x_1 + H_{32} W_2 x_2 + H_{33} W_3 x_3 + n_3 \end{cases} \quad (13)$$

In equation group (13), $H_{ik}$ is a 4×4 diagonal matrix, $W_k = [w_{k1} \ w_{k2}]$ is a 4×2 pre-coding matrix, and $x_k$ is 2×1 vector. The prerequisite of accomplishing interference alignment is:

$$\begin{cases} H_{13} W_3 = H_{12} W_2 D_1 \\ H_{23} W_3 = H_{21} W_1 D_2 \\ H_{32} W_2 = H_{31} W_1 D_3 \end{cases} \quad (14)$$

The linear equation group (14) may be expressed as:

$$\begin{bmatrix} 0 & 0 & \alpha_1 H_{13} & \beta_1 H_{13} & -H_{15} & 0 \\ 0 & 0 & \alpha_2 H_{13} & \beta_2 H_{13} & 0 & -H_{15} \\ \alpha_3 H_{31} & \beta_3 H_{31} & 0 & 0 & -H_{35} & 0 \\ \alpha_4 H_{31} & \beta_4 H_{31} & 0 & 0 & 0 & -H_{35} \\ \alpha_5 H_{51} & \beta_5 H_{51} & -H_{53} & 0 & 0 & 0 \\ \alpha_6 H_{51} & \beta_6 H_{51} & 0 & -H_{53} & 0 & 0 \end{bmatrix} \begin{bmatrix} w_1 \\ w_2 \\ w_3 \\ w_4 \\ w_5 \\ w_6 \end{bmatrix} = 0 \quad (15)$$

Supposing $T = H_{21}^{-1} H_{23} H_{13}^{-1} H_{12} H_{32}^{-1} H_{31}$, $D_2 = \text{diag}\{\lambda_1, \lambda_2\}$, and $D_1 = D_3 = I$, $W_1 = [w_{11} \ w_{12}]$ represents two eigenvectors of T, namely, $$T w_{11} = \lambda_1 w_{11}, T w_{12} = \lambda_2 w_{12} \quad (16)$$

Once $W^1$ is obtained, other pre-coding vectors may be obtained according to:

$$\begin{cases} W_3 = H_{23}^{-1} H_{21} W_1 D_2 \\ W_2 = H_{32}^{-1} H_{31} W_1 D_3 \end{cases} \quad (17)$$

Paired with the interference elimination method on the transmitter, an interference elimination method on the receiver is provided in an embodiment of the present invention. In this case, the receiving filtering vector $g_k$ on the user side instead of the pre-coding vector on the transmitter is solved. In a single-flow scenario, for eliminating interference, the following equations are applied:

$$w_i^H H_{ki}^H g_k = 0|_{k \neq i},$$

$$w_i^H H_{ii}^H g_i = d_i$$

Supposing $b_k = H_{ki}^H g_k$, $w_i^H b_k = 0|_{j \neq i}$, where $b_k = (b_{k1}, b_{k2}, \ldots, b_{kN})^T$. The following linear equation group inclusive of K equations is obtained:

$$\begin{cases} b_{1i} w_{i1}^* + b_{12} w_{i2}^* + \ldots + b_{1M} w_{iM}^* = 0 \\ \ldots \\ b_{i-1,1} w_{i1}^* b_{i-1,2} w_{i2}^* + \ldots + b_{i-1,M} w_{iM}^* = 0 \\ b_{i1} w_{i1}^* + b_{i2} w_{i2}^* + \ldots + b_{iM} w_{iM}^* = d_i \\ b_{i+1,1} w_{i1}^* + b_{i+1,2} w_{i2}^* + \ldots + b_{i+1,M} w_{iM}^* = 0 \\ \ldots \\ b_{K1} w_{i1}^* + b_{K2} w_{i2}^* + \ldots + b_{KM} w_{iM}^* = 0 \end{cases} \quad (18)$$

The prerequisite for ensuring a non-zero solution to linear equation group (18) is: The coefficient vector of K−M interference zero forcing equations among the K equations above is a linear combination of coefficient vectors of the other M−1 interference zero forcing equations except the $k^{th}$ equation. That prerequisite is a constraint condition of interference alignment:

$$H_{k_n,i}^H g_{k_n} = \sum_{m=1}^{M-1} \beta_{im} H_{k_m,i}^H g_{k_m} \quad (19)$$

In equation (19), $k = 1, 2, \ldots, K_m|_{m=1,2,\ldots,M-1} \in \Gamma_{i1}$, $k_n|_{n=1,2,\ldots,K-M} \in \Gamma_{i2}$, $\alpha_{kn}$ represents a combination coefficient, is a collection of aligned interference vectors and includes M−1 elements, $\Gamma_{i2}$ is a collection of the other interference vectors and includes K−M elements, and $\Gamma_{i1} \cup \Gamma_{i2} \cup \{k\} = \{1, 2, \ldots, K\}$. It is deducible that the interference alignment can be accomplished when the upper limit of the sum of signal flows of all users is $$\frac{M^2 K}{MK - N}$$

rounded down or $$\frac{MK}{2}$$

rounded down, whichever is lower, namely, when the upper limit is $$\min\left\{\left\lfloor \frac{M^2 K}{MK - M} \right\rfloor, \left\lfloor \frac{MK}{2} \right\rfloor\right\},$$

where $\lfloor \ \rfloor$ refers to rounding down.

The single-flow scenario may be generalized into the multi-flow scenario: At least L−M linear combinations may be obtained for each user, where: a linear combination includes aligned interference vectors and linear combinations of M−$L_k$ interference vectors, M is the number of transmitting antennas on the transmitter, and L is a sum of the signal flows of all users.

Supposing M=N=3 and K=4 in a single-flow scenario, equation (19) may be used to obtain:

$$\begin{bmatrix} 0 & \alpha_1 H_{21}^H & \beta_1 H_{31}^H & -H_{41}^H \\ \alpha_2 H_{12}^H & 0 & \beta_2 H_{32}^H & -H_{42}^H \\ \alpha_3 H_{13}^H & \beta_3 H_{23}^H & 0 & -H_{43}^H \\ \alpha_4 H_{14}^H & \beta_4 H_{24}^H & -H_{34}^H & 0 \end{bmatrix} \begin{bmatrix} g_1 \\ g_2 \\ g_3 \\ g_4 \end{bmatrix} = 0 \quad (20)$$

Supposing that $\beta_2, \beta_4, \alpha_3$ are all 0s, it is easy to obtain:

$$\begin{cases} g_1 = \alpha_2^{-1} (H_{12}^H)^{-1} H_{42}^H g_4 \\ g_2 = \beta_3^{-1} (H_{23}^H)^{-1} H_{43}^H g_4 \\ g_3 = \alpha_4 \alpha_2^{-1} (H_{34}^H)^{-1} H_{14}^H (H_{12}^H)^{-1} H_{42}^H g_4 \end{cases} \quad (21)$$

$$H_{41}^H g_4 = \quad (22)$$
$$\alpha_1 \lfloor \beta_3^{-1} H_{21}^H (H_{23}^H)^{-1} H_{43}^H + \alpha_1^{-1} \beta_1 \alpha_4 \alpha_2^{-1} H_{31}^H (H_{34}^H)^{-1} H_{14}^H (H_{12}^H)^{-1} H_{42}^H \rfloor g_4$$

Supposing $\beta_1 = \alpha_1$, $g_4$ is an eigenvector of the following 3×3 matrix:

$$H_{41}^H [\beta_3^{-1} H_{21}^H (H_{23}^{-H})^{-1} H_{43}^H + \alpha_4 \alpha_2^{-1} H_{31}^H \\ (H_{34}^{-1})^{-1} H_{14}^H (H_{12}^{-H})^{-1} H_{42}^H]^{-1} \quad (23)$$

According to the existing method of obtaining an eigenvector, $g_4$ is obtained. According to equation group (21), other receiving filtering vectors are obtained.

If M=N=4, K=4, L=5, and the number of signal flows of the first user is 2, the following equation works:

$$\begin{bmatrix} 0 & 0 & \beta_1 H_{21}^H & \gamma_1 H_{31}^H & -H_{41}^H \\ \alpha_2 H_{12}^H & \beta_2 H_{12}^H & 0 & \gamma_2 H_{32}^H & -H_{42}^H \\ \alpha_3 H_{13}^H & \beta_3 H_{13}^H & -H_{23}^H & 0 & \gamma_3 H_{43}^H \\ \alpha_4 H_{14}^H & \beta_4 H_{14}^H & \gamma_4 H_{24}^H & -H_{34}^H & 0 \end{bmatrix} \begin{bmatrix} g_{11} \\ g_{12} \\ g_2 \\ g_3 \\ g_4 \end{bmatrix} = 0 \quad (24)$$

After the predefined receiving filtering vector $g_4$ is selected, equation (24) may be transformed into:

$$\begin{bmatrix} 0 & 0 & \beta_1 H_{21}^H & \gamma_1 H_{31}^H \\ \alpha_2 H_{12}^H & \beta_2 H_{12}^H & 0 & \gamma_2 H_{32}^H \\ \alpha_3 H_{13}^H & \beta_3 H_{13}^H & -H_{23}^H & 0 \\ \alpha_4 H_{14}^H & \beta_4 H_{14}^H & \gamma_4 H_{24}^H & -H_{34}^H \end{bmatrix} \begin{bmatrix} g_{11} \\ g_{12} \\ g_2 \\ g_3 \end{bmatrix} = \begin{bmatrix} H_{41}^H g_4 \\ H_{42}^H g_4 \\ -\gamma_3 H_{43}^H g_4 \\ 0 \end{bmatrix} \quad (25)$$

Supposing that $\beta_1, \alpha_2, \gamma_2, \alpha_3, \beta_3, \beta_4, \gamma_4$ are all 0s, it is easy to obtain:

$$\begin{cases} g_{11} = \alpha_4^{-1}\gamma_1^{-1}(H_{14}^H)^{-1}H_{34}^H(H_{31}^H)^{-1}H_{41}^H g_4 \\ g_{12} = \beta_2^{-1}(H_{12}^H)^{-1}H_{42}^H g_4 \\ g_2 = \gamma_3(H_{23}^H)^{-1}H_{43}^H g_4 \\ g_3 = \gamma_1^{-1}(H_{31}^H)^{-1}H_{41}^H g_4 \end{cases} \quad (26)$$

Supposing that M=N=4, K=3, L=6, and the number of signal flows transmitted for the users is 2, 2, and 2 respectively, the following equation group works:

$$\begin{cases} H_{31}^H G_3 = H_{21}^H G_2 D_1 \\ H_{32}^H G_3 = H_{12}^H G_1 D_2 \\ H_{23}^H G_2 = H_{13}^H G_1 D_3 \end{cases} \quad (27)$$

$G_k = [g_{k1}\ g_{k2}]$, k=1, 2, 3, and $D_1$, $D_2$, $D_3$ are 2×2 matrixes. It is easy to obtain:

$$\begin{cases} TG_1 = G_1 D_1 \\ G_2 = (H_{23}^H)^{-1}H_{13}^H G_1 D_3 \\ G_3 = (H_{32}^H)^{-1}H_{12}^H G_1 D_2 \end{cases} \quad (28)$$

Here, $T = (H_{12}^H)^{-1}H_{32}(H_{31}^H)^{-1}H_{21}(H_{23}^H)^{-1}H_{13}$. Supposing that $D_2$ is a diagonal matrix, $g_{11}$ and $g_{12}$ are two eigenvectors of the 4×4 matrix T. The subsequent steps of solving the equations are similar to the scenario of (16) and (17).

For the interference elimination method on the receiver, after the receiving filtering vector is calculated out, the pre-coding vector of the transmitter may be calculated out. The pre-coding vector $w_i$ of the $k^{th}$ transmitter is $$\left(\sum_{k=1}^{K} H_{ki}^H g_k g_k^H H_{ki} + \sigma^2 I_M\right)^{-1} H_{ii}^H g_i \text{ or}$$

$$\left(\sum_{k=1, k \neq i}^{K} H_{ki}^H g_k g_k^H H_{ki} + \sigma^2 I_M\right)^{-1} H_{ii}^H g_i,$$

where $\sigma^2$ is a square error of noise, $I_M$ is an M×M unit matrix, $(\bullet)^H$ refers to conjugate transposition of a matrix, and $(\bullet)^{-1}$ refers to inversion of a matrix.

A method for determining a preferred interference elimination method is provided in an embodiment of the present invention. In some scenarios, the interference elimination method on the transmitter is preferred; in other scenarios, the interference elimination method on the receiver is preferred. More specifically:

If the number of transmitting antennas (M) of the transmitter is smaller than or equal to the number of receiving antennas (N), the transformer performs the following operations:

obtain the interference vector of each user, where: the interference vector of the $k^{th}$ user is $H_{ki}w_{im}$; k≠i; m=1, 2, ..., $L_k$; k and i are positive integers; k=1, 2, ... K; K is the number of users; $H_{ki}$ is a channel matrix from the $i^{th}$ transmitter to the $k^{th}$ user; $w_{im}$ is a pre-coding vector of the $i^{th}$ transmitter; and $L_k$ is the number of signal flows of the $k^{th}$ user;

obtain at least L–N linear combinations for each user, where: the linear combination comprises linear combinations of aligned interference vectors and the linear combinations of N–$L_k$ interference vectors, N is the number of receiving antennas of the user, L is the sum of the signal flows of all users, $$L < \left\lfloor \frac{N^2 K}{NK - M} \right\rfloor,$$

and $\lfloor \bullet \rfloor$ refers to rounding down;

obtain pre-coding vectors of all transmitters according to the linear combinations of all users; and send the signals pre-coded using the pre-coding vectors.

If the number of transmitting antennas (M) of the transmitter is greater than the number of receiving antennas (N), the transmitter performs the following operations:

Obtain an interference vector of each user, where: the interference vector of the $k^{th}$ user is $H_{ki}^H g_{km}$; k≠i, m=1, 2, ..., $L_k$; k and i are positive integers, and k=1, 2, ... K; m is an index of the number of signal flows; K is the number of users; $g_{km}$ is the receiving filtering vector of the $k^{th}$ user; $L_k$ is the number of the signal flows of the $k^{th}$ user; and $(\bullet)^H$ refers to conjugate transposition of a matrix;

Obtain at least L–M linear combinations for each user, where: a linear combination includes linear combinations of aligned interference vectors and linear combinations of M–$L_k$ interference vectors, M is the number of transmitting antennas on the transmitter, and $$L < \left\lfloor \frac{M^2 K}{MK - N} \right\rfloor;$$

and

Obtain the receiving filtering vector of each user according to the linear combinations of all users.

The interference elimination method based on the transmitter and the interference elimination method based on the receiver in an embodiment of the present invention can eliminate interference for a communication system with any number of users and any number of antennas. When they are applied to eliminate interference between cells, the costs of the service provider are reduced drastically and the system performance is improved at a low cost.

Figure 4:
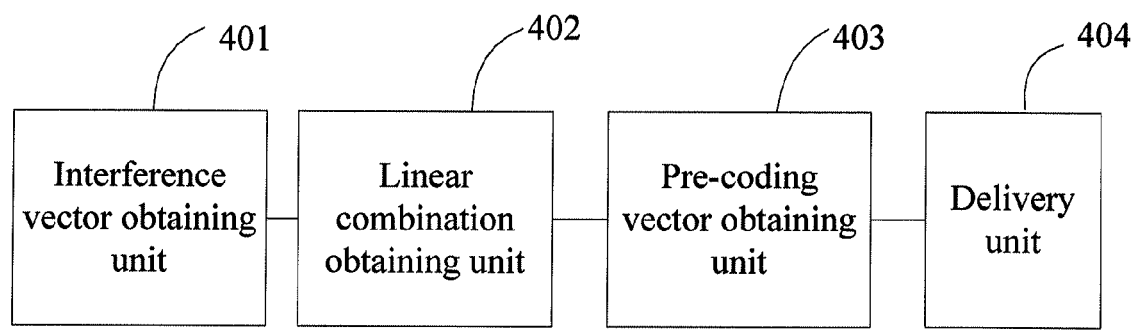
FIG. 4 shows a structure diagram of a transmitter-side apparatus in an embodiment of the present invention.

Accordingly, a data transmitting apparatus such as BS is provided in an embodiment of the present invention. As shown in FIG. 4, the data transmitting apparatus includes:

an interference vector obtaining unit 401, configured to: obtain an interference vector of each user, where: the interference vector of the $k^{th}$ i user is $H_{ki}w_{im}$; k, i, and m are positive integers, 1≤k≤K, k≠i, 1≤m≤$L_k$, m is an index of the number of signal flows, and K is the number of users; $L_k$ is the number of signal flows of the $k^{th}$ user; $H_{ki}$ is a channel matrix from the $i^{th}$ transmitter to the $k^{th}$ user; and $w_{im}$ is a pre-coding vector of the $i^{th}$ transmitter with the index of the number of the signal flows being m;

a linear combination obtaining unit 402, configured to: obtaining at least L–N linear combinations for each user, where: the linear combination includes linear combinations of aligned interference vectors and linear combinations of N–$L_k$ interference vectors, N is the number of receiving antennas of the user, and L is the sum of the signal flows of all users;

a pre-coding vectors obtaining unit 403, configured to: obtain pre-coding vectors of all transmitters according to linear combinations of all users; and a sending unit 404, configured to send signals pre-coded using the pre-coding vectors.

The apparatus may further include a receiving filtering vector obtaining unit, configured to obtain the receiving filtering vector of each user according to the pre-coding vectors obtained by the pre-coding vectors obtaining unit, where: the receiving filtering vector $g_k$ of the $k^{th}$ user is $$\left(\sum_{i=1}^{K} H_{ki}w_i w_i^H H_{ki}^H + \sigma^2 I_N\right)^{-1} H_{kk} w_k \text{ or}$$

$$\left(\sum_{i=1, i\neq k}^{K} H_{ki}w_i w_i^H H_{ki}^H + \sigma^2 I_N\right)^{-1} H_{kk} w_k,$$

$\sigma^2$ is a square error of noise, $I_N$ is an N×N unit matrix, $(\bullet)^H$ refers to conjugate transposition of a matrix, and $(\bullet)^{-1}$ refers to the inversion of a matrix.

Figure 5:
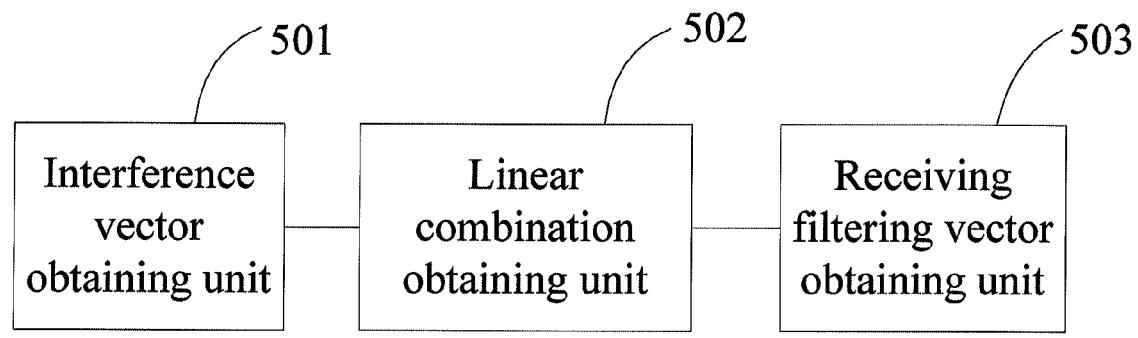
FIG. 5 shows a structure diagram of another transmitter-side apparatus in an embodiment of the present invention.

Corresponding to the interference elimination method on the receiver, another data transmitting apparatus is provided in an embodiment of the present invention. As shown in FIG. 5, the data transmitting apparatus includes:

an interference vector obtaining unit 501, configured to obtain an interference vector of each user, where: the interference vector of the $k^{th}$ user is $H_{ki}^H g_{km}$; k, i, and m are positive integers, $1 \leq k \leq K$, $k \neq i$, $1 \leq m \leq L_k$, m is an index of the number of signal flows, and K is the number of users; $L_k$ is the number of the signal flows of the $k^{th}$ user; $H_{ki}$ is a channel matrix from the $i^{th}$ transmitter to the $k^{th}$ user; $g_{km}$ is a receiving filtering vector of the $k^{th}$ user with the index of the number of signal flows being m; and $L_k$ refers to conjugate transposition of a matrix;

a linear combination obtaining unit 502, configured to: obtain at least L−M linear combinations for each user, where: the linear combination includes linear combinations of aligned interference vectors and linear combinations of M−$L_k$ interference vectors, M is the number of transmitting antennas on the transmitter, and L is a sum of the signal flows of all users; and a receiving filtering vector obtaining unit 503, configured to obtain a receiving filtering vector of each user according to linear combinations of all users.

Further, the apparatus may further include a pre-coding vector obtaining unit, which is configured to obtain the pre-coding vectors of all transmitters according to the receiving filtering vector obtained by the receiving filtering vector obtaining unit, where: the pre-coding vector $w_i$ of the $k^{th}$ transmitter is $$\left(\sum_{k=1}^{K} H_{ki}^H g_k g_k^H H_{ki} + \sigma^2 I_M\right)^{-1} H_{ii}^H g_i \text{ or}$$

$$\left(\sum_{k=1, k\neq i}^{K} H_{ki}^H g_k g_k^H H_{ki} + \sigma^2 I_M\right)^{-1} H_{ii}^H g_i,$$

$\sigma^2$ is a square error of noise, $I_m$ is an M×M unit matrix, $(\bullet)^H$ refers to conjugate transposition of a matrix, and $(\bullet)^{-1}$ refers to the inversion of a matrix.

The data transmitting apparatus provided in the embodiment of the present invention may be any one of the BS, the relay station, the user equipment, and the mobile terminal, and so on. The data transmitting apparatus can eliminate interference for a communication system with any number of users and any number of antennas. When it is applied to eliminate interference between cells, the costs of the service provider are reduced drastically and the system performance is improved at a low cost.

The units and the calculation described herein may be implemented by electronic hardware, computer software, or both of them. In order to clarify the interchangeability of hardware and software, the foregoing text has described the composition of the exemplary apparatus and the steps of the exemplary calculation generally according to functions. As regards whether the functions are implemented through hardware or through software, it depends on the specific application of the technical solution and the constraint conditions of the design. Those skilled in the art can use different methods to implement the described functions for each specific application, and such implementation is never regarded as falling outside the scope of the embodiments of the present invention.

The method or calculation steps described herein may be implemented through hardware directly or through a software module of a processor, or through both of them. The software module may be set in a Random Access Memory (RAM), computer memory, Read-Only Memory (ROM), electrically programmable ROM, electrically erasable programmable ROM, register, hard disk, moveable disk, CD-ROM, or any other form of storage media well-known in the art.

The invention claimed is:

1. An interference elimination method, comprising:
obtaining, by an $i^{th}$ transmitter of a group transmitters, an interference vector of each user of one or more users, wherein: the interference vector of the $k^{th}$ user is $H_{ki}w_{im}$; k, i, and m are positive integers, $1 \leq k \leq K$, $k \neq i$, $1 \leq m \leq L_k$, m is an index of the number of signal flows from the $k^{th}$ user, K is the number of users, $L_k$ is the number of the signal flows of the $k^{th}$ user, $H_{ki}$ is a channel matrix in a direction from the $i^{th}$ transmitter to the $k^{th}$ user, and $w_{im}$ is a pre-coding vector of the $i^{th}$ transmitter with the index of the number of the signal flows being m;
obtaining at least L−N linear combinations for each user, wherein: the linear combinations include linear combinations of aligned interference vectors and linear combinations of N−$L_k$ interference vectors, N is the number of receiving antennas of the user, and L is a sum of the signal flows of all users;
obtaining pre-coding vectors of all transmitters according to the linear combinations of all users; and
sending signals pre-coded using the pre-coding vectors.

2. The method of claim 1, wherein: if $L_k=1$, the linear combination is:

$$H_{k,i_m} w_{i_m} = \sum_{n=1}^{N-1} \alpha_{kn} H_{k,i_n} w_{i_n},$$

wherein k=1, 2, . . . , K, $i_n|_{n=1,2,\ldots,N-1} \in S_{k1}$, $i_m|_{m=1,2,\ldots,K-N} \in S_{k2}$, $\alpha_{kn}$ is a combination coefficient, $S_{k1}$ is a collection of the aligned interference vectors and comprises N−1 elements, $S_{k2}$ is a collection of the other interference vectors and comprises K−N elements, and $S_{k1} \cup S_{k2} \cup \{k\} = \{1, 2, \ldots, K\}$.

3. The method of claim 2, wherein the obtaining of pre-coding vectors of all transmitters according to the linear combinations of all users comprises:

obtaining an equation group inclusive of K equations according to the linear combinations of all users, and solving the equation group to obtain the pre-coding vectors of all transmitters.

4. The method of claim 1, wherein:
an upper limit of the sum of flows of all users is $$\min\left\{\left\lfloor\frac{N^2K}{NK-M}\right\rfloor,\left\lfloor\frac{NK}{2}\right\rfloor\right\},$$

wherein M is the number of transmitting antennas of a transmitter and $\lfloor\ \rfloor$ refers to rounding down.

5. The method of claim 4, wherein the number of transmitting antennas of the transmitter is smaller than or equal to the number or receiving antennas of the user.

6. The method of claim 1, further comprising:
obtaining a receiving filtering vector of each user according to the obtained pre-coding vectors, wherein: the receiving filtering vector of the $k^{th}$ user is $$g_k = \left(\sum_{i=1}^{K} H_{ki}w_i w_i^H H_{ki}^H + \sigma^2 I_N\right)^{-1} H_{kk} w_k \text{ or}$$

$$g_k = \left(\sum_{i=1,i\neq k}^{K} H_{ki}w_i w_i^H H_{ki}^H + \sigma^2 I_N\right)^{-1} H_{kk} w_k,$$

$w_i$ is a pre-coding vector of the $i^{th}$ transmitter, $w_k$ is a pre-coding vector of the $k^{th}$ transmitter, $H_{kk}$ is a channel in a direction from the $k^{th}$ transmitter to the $k^{th}$ user, $\sigma^2$ is a square error of noise, $I_N$ is an N×N unit matrix, $(\bullet)^H$ refers to conjugate transposition of the matrix, and $(\bullet)^{-1}$ refers to inversion of the matrix.

7. An interference elimination method, comprising:
obtaining, by an $i^{th}$ transmitter of a group of transmitters, an interference vector of each user of one or more users, wherein: the interference vector of the $k^{th}$ user is $H_{ki}^H g_{kn}$; k, i, and m are positive integers, $1 \le k \le K$, $k \ne i$, $1 \le m \le L_k$, m is an index of the number of signal flows from the $k^{th}$ user, K is the number of users, $L_k$ is the number of the signal flows of the $k^{th}$ user, $H_{ki}$ is a channel matrix in a direction from the $i^{th}$ transmitter to the $k^{th}$ user, $g_{km}$ is a receiving filtering vector of the $k^{th}$ user with the index of the number of signal flows being m; and $(\bullet)^H$ refers to conjugate transposition of the matrix;
obtaining at least L−M linear combinations for each user, wherein: the linear combinations comprise linear combinations of aligned interference vectors and linear combinations of M−$L_k$ interference vectors, M is the number of transmitting antennas on the transmitter, and L is a sum of the signal flows of all users; and
obtaining receiving filtering vectors of all users according to the linear combinations of all users.

8. The method of claim 7, wherein: if $L_k$=1, the linear combination is:

$$H_{k_n,i}^H g_{k_n} = \sum_{m=1}^{M-1} \beta_{im} H_{k_m,i}^H g_{k_m},$$

wherein: i=1, 2, . . . , K, $k_m|_{m=1,2,\ldots,M-1} \in \Gamma_{i1}$, $k_n|_{n=1,2,\ldots,K-M} \in \Gamma_{i2}$, $\beta_{im}$ is a combination coefficient, $\Gamma_{i1}$ is a collection of aligned interference vectors and comprises M−1 elements, $\Gamma_{i2}$ is a collection of the other interference vectors and comprises K−M elements, and $\Gamma_{i1} \cup \Gamma_{i2} \cup \{i\} = \{1, 2, \ldots, K\}$.

9. The method of claim 8, wherein the obtaining the receiving filtering vectors of all users according to the linear combinations of all users comprises:
obtaining an equation group inclusive of K equations according to the linear combinations of all users, and solving the equation group to obtain the receiving filtering vectors of all users.

10. The method of claim 7, wherein:
an upper limit of a sum of the signal flows of all users is $$\min\left\{\left\lfloor\frac{M^2K}{MK-M}\right\rfloor,\left\lfloor\frac{MK}{2}\right\rfloor\right\},$$

wherein M is the number of transmitting antennas of a transmitter and $\lfloor\ \rfloor$ refers to rounding down.

11. The method of claim 7, further comprising:
obtaining pre-coding vectors of all transmitters according to the receiving filtering vectors, wherein: the pre-coding vector of the $i^{th}$ transmitter is $$w_i = \left(\sum_{k=1}^{K} H_{ki}^H g_k g_k^H H_{ki} + \sigma^2 I_M\right)^{-1} H_{ii}^H g_i \text{ or}$$

$$w_i = \left(\sum_{k=1,k\neq i}^{K} H_{ki}^H g_k g_k^H H_{ki} + \sigma^2 I_M\right)^{-1} H_{ii}^H g_i,$$

$g_k$ is a receiving filtering vector of the $k^{th}$ user, $g_i$ is a receiving filtering vector of the $i^{th}$ user, $H_{ii}$ is a channel in a direction from the $i^{th}$ transmitter to the $i^{th}$ user, $\sigma^2$ is a square error of noise, $I_M$ is an M×M unit matrix, $(\bullet)^H$ refers to conjugate transposition of the matrix, and $(\bullet)^{-1}$ refers to inversion of the matrix.

12. A transmitter, wherein the transmitter is an $i^{th}$ transmitter of a group of transmitters, comprising:
a hardware processor, configured to: obtain an interference vector of each user of one or more users, wherein: the interference vector of the $k^{th}$ user is $H_{ki}w_{im}$; k, i, and m are positive integers, $1 \le k \le K$, $k \ne i$, $1 \le m \le L_k$, m is an index of the number of signal flows from the $k^{th}$ user, K is the number of users, $L_k$ is the number of the signal flows of the $k^{th}$ user, $H_{ki}$ is a channel matrix in a direction from the $i^{th}$ transmitter to the $k^{th}$ user, and $w_{im}$ is a pre-coding vector of the $i^{th}$ transmitter with the index of the number of the signal flows being m;
obtain at least L−N linear combinations for each user, wherein: the linear combinations comprise linear combinations of aligned interference vectors and linear combinations of N−$L_k$ interference vectors, N is the number of receiving antennas of the user, and L is a sum of the signal flows of all users;
obtain pre-coding vectors of all transmitters according to the linear combinations of all users; and
send signals pre-coded using the pre-coding vectors.

13. The apparatus of claim 12, the hardware processor is further configured to obtain a receiving filtering vector of each user according to the obtained pre-coding vectors, wherein: the receiving filtering vector $g_k$ of the $k^{th}$ user is $$\left(\sum_{i=1}^{K} H_{ki} w_i w_i^H H_{ki}^H + \sigma^2 I_N\right)^{-1} H_{kk} w_k \text{ or}$$

$$\left(\sum_{i=1, i\neq k}^{K} H_{ki} w_i w_i^H H_{ki}^H + \sigma^2 I_N\right)^{-1} H_{kk} w_k,$$

$w_i$ is a pre-coding vector of the $i^{th}$ transmitter, $w_k$ is a pre-coding vector of the $k^{th}$ transmitter, $H_{kk}$ is a channel in a direction from the $k^{th}$ transmitter to the $k^{th}$ user, $\sigma^2$ is a square error of noise, $I_N$ is an N×N unit matrix, $(\bullet)^H$ refers to conjugate transposition of the matrix, and $(\bullet)^{-1}$ refers to inversion of the matrix.

14. A transmitter, comprising:
a hardware processor, configured to obtain an interference vector of each user of one or more users, wherein: the interference vector of the $k^{th}$ user is $H_{ki}^H g_{km}$; k, i, and m are positive integers, $1 \leq k \leq K$, $k \neq i$, $1 \leq m \leq L_k$, m is an index of the number of signal flows from the $k^{th}$ user, K is the number of users, $L_k$ is the number of the signal flows of the $k^{th}$ user, $H_{ki}$ is a channel matrix in a direction from the $i^{th}$ transmitter to the $k^{th}$ user, $g_{km}$ is a receiving filtering vector of the $k^{th}$ user with the index of the number of signal flows being m, and $(\bullet)^H$ refers to conjugate transposition of the matrix;
obtain at least L−M linear combinations for each user, wherein: the linear combinations comprise linear combinations of aligned interference vectors and linear combinations of M−$L_k$ interference vectors, M is the number of transmitting antennas on the transmitter, and L is a sum of the signal flows of all users; and
obtain receiving filtering vectors of all users according to the linear combinations of all users.

15. The apparatus of claim 14, wherein the hardware processor is configured to obtain pre-coding vectors of all transmitters according to
the receiving filtering vectors, wherein: the pre-coding vector $w_i$ of the $i^{th}$ transmitter is $$\left(\sum_{k=1}^{K} H_{ki}^H g_k g_k^H H_{ki} + \sigma^2 I_M\right)^{-1} H_{ii}^H g_i \text{ or}$$

$$\left(\sum_{k=1, k\neq i}^{K} H_{ki}^H g_k g_k^H H_{ki} + \sigma^2 I_M\right)^{-1} H_{ii}^H g_i,$$

$g_k$ is a receiving filtering vector of the $k^{th}$ user, $g_i$ is a receiving filtering vector of the $i^{th}$ user, $H_{ii}$ is a channel in a direction from the $i^{th}$ transmitter to the $i^{th}$ user, $\sigma^2$ is a square error of noise, $I_M$ is an M×M unit matrix, $(\bullet)^H$ refers to conjugate transposition of the matrix, and $(\bullet)^{-1}$ refers to inversion of the matrix.

\* \* \* \* \*

UNITED STATES PATENT AND TRADEMARK OFFICE
CERTIFICATE OF CORRECTION

PATENT NO.      : 8,599,978 B2                                    Page 1 of 1
APPLICATION NO. : 13/293774
DATED           : December 3, 2013
INVENTOR(S)     : Sheng Liu It is certified that error appears in the above-identified patent and that said Letters Patent is hereby corrected as shown below:

In the Claims

In column 15, claim 5, line 17, before "receiving antennas of the" replace "or" with --of--.

Signed and Sealed this
Fifteenth Day of April, 2014

Michelle K. Lee
*Deputy Director of the United States Patent and Trademark Office*